(No Model.) 2 Sheets—Sheet 1.

W. EBERHARD.
GRAIN CUTTING MACHINE.

No. 313,483. Patented Mar. 10, 1885.

Witnesses
George F. Robinson
Harry L. Beatty

Inventor
William Eberhard
By Bradford Howland
Attorney (No Model.) 2 Sheets—Sheet 2.

W. EBERHARD.
GRAIN CUTTING MACHINE.

No. 313,483. Patented Mar. 10, 1885.

Witnesses
George F. Robinson
Harry L. Beatty.

Inventor
William Eberhard
By Bradford Howland
Attorney

UNITED STATES PATENT OFFICE.

WILLIAM EBERHARD, OF AKRON, OHIO, ASSIGNOR TO HIMSELF AND GEORGE T. FORD, OF SAME PLACE.

GRAIN-CUTTING MACHINE.

SPECIFICATION forming part of Letters Patent No. 313,483, dated March 10, 1885.

Application filed August 20, 1884. (No model.)

*To all whom it may concern:*

Be it known that I, WILLIAM EBERHARD, a citizen of the United States, residing at Akron, Summit county, Ohio, have invented a new and useful Improvement in Grain-Cutting Machines, of which the following is a specification.

My invention relates to a machine for cutting oats and other grain into coarse particles of meal by means of a knife having a reciprocating movement to and from a carrier, which moves the kernels under the knife.

Figure 1:
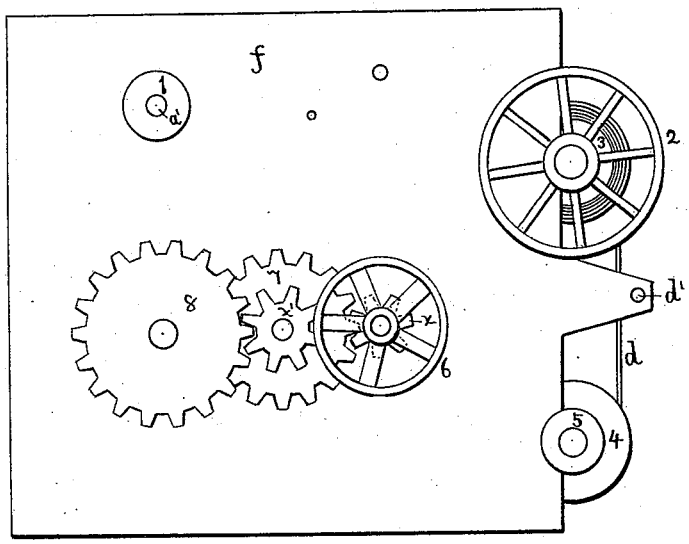
Figure 3:
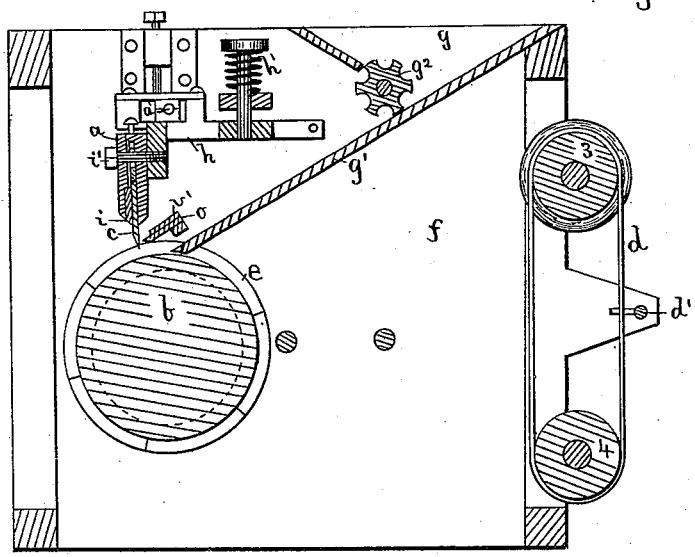
Figure 2:
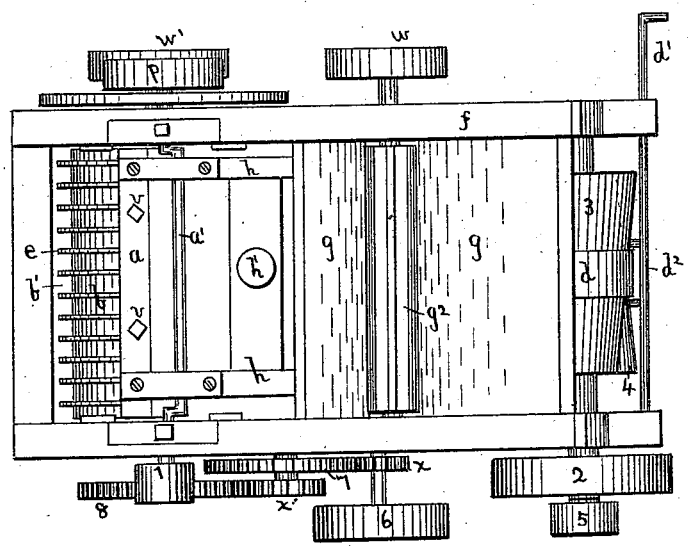
Figure 4:
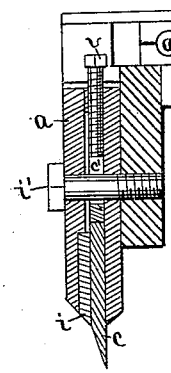
Figure 5:
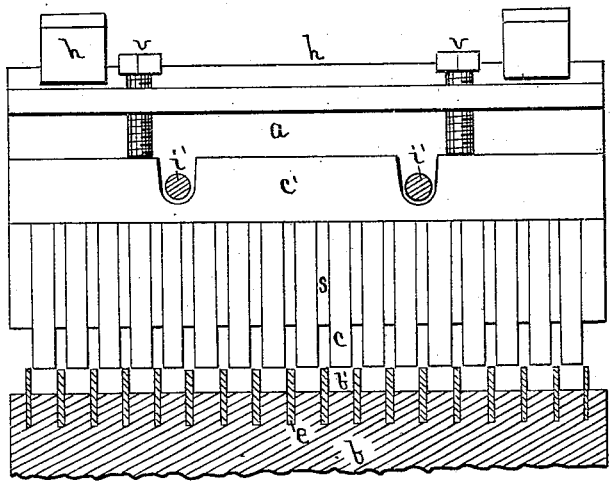

In the drawings, forming a part of this specification, Figure 1 is a side elevation of the machine. Fig. 2 is a plan of the same. Fig. 3 is a vertical section. Fig. 4 is an enlarged sectional view of the knife-clamp, and Fig. 5 is a front view of the same with the front jaw of the clamp removed.

A rapid reciprocating motion is given to the knife-clamp $a$ by means of driving-pulley $p$ on its crank-shaft $a'$.

Clamp $a$ holds a series of cutters, $c$, forming the knife, which severs the kernels brought under it by the rotary carrier $b$.

Carrier $b$ is a cylinder formed with annular grooves $b'$, in which the kernels are carried under cutters $c$. It should be of wood, paper, rawhide, or other suitable material, that will not dull the edges of cutters $c$ when they come in contact with the bottom of grooves $b'$ in severing the kernels. I prefer to make it of pieces of wood, with the grain of the wood at the periphery of the carrier radial to its axis. Annular grooves $b'$ are formed by thin steel rings $e$, shaped like a washer and cut into segments, which are driven into the periphery of carrier $b$. The carrier is slowly rotated, by means of a train of pulleys, wheels, and pinions, consisting of pulley 1 on the crank-shaft $a'$ of knife-clamp $a$, connected by belting with pulleys 2, 3, 4, 5, and 6, pinion $x$, wheel 7, pinion $x'$, and wheel 8 on the carrier-shaft. These pulleys, wheels, and pinions are supported on their shafts in frame $f$, and are of such relative diameters that while crank-shaft $a'$, which actuates the series of cutters $c$, is making one revolution, carrier $b$ is turned forward a distance equal to the length of the particles into which the kernels are to be cut. The length of these particles may be changed by adjusting belt $d$ on cone-pulleys 3 and 4 by means of sliding rod $d'$, provided with fork $d^2$. The bearings of crank-shaft $a'$ are made adjustable vertically in frame $f$. Clamp $a$ is bolted to lever $h$, pivoted to the frame, and provided with a pin and spring, $h'$, to support or counterbalance the weight of clamp $a$.

The grain is fed through hopper $g$, which has a shoe, $g'$, and is provided with a grooved feed-roll, $g^2$, connected by its pulley $w$ with pulley $w'$ on the carrier-shaft, and operated by a belt.

Cutters $c$ are thin pieces of steel, nearly or quite as wide as grooves $b'$, and are separated by placing between them metal strips $s$, of the same thickness as rings $e$.

One of the jaws of clamp $a$ is provided with a rubber strip, $i$, at the bottom, to firmly hold the series of cutters $c$ in position when the jaws of the clamp are tightened together by turning bolts $i'$.

A follower, $c'$, consisting of a thin plate slotted to receive bolts $i'$, is used in connection with bolts $v$ through the top of clamp $a$ to adjustably hold cutters $c$ in position vertically.

If preferred, the knife consisting of the series of cutters $c$ may be formed of a single piece of steel slotted across its edge to receive rings $e$, which divide the periphery of carrier $b$ into annular grooves $b'$.

The grain fed through hopper $g$ passes down shoe $g'$ into grooves $b'$ of carrier $b$.

A strike, $o$, supported at each end in frame $f$, and consisting of a strip of thick leather attached to the under side of bar $v'$, covers grooves $b'$ just back of the knife and prevents the passage to the knife of any kernels which do not lie in the grooves. I prefer that the part of strike $o$ which is in contact with rings $e$ should be of leather rather than metal, as it more effectually prevents the rear end of the kernels from flying back when the front end is severed.

In place of the train of pulleys and wheels connecting the driving-pulley with the carrier, a worm may be used in connection with wheel 8, in the ordinary way, intermediate crank-shaft, $a'$, and the carrier-shaft to transmit power from the former to the latter.

Instead of forming carrier $b$ with annular grooves $b'$, stationary dividers, like segments of rings e, may be employed by placing them close to the upper side of the carrier, with a reciprocating knife just in front of them; but I have found that the friction of the kernels against the sides of such dividers retards them in approaching the knife. It is not essential that carrier b should be cylindrical, as it may be made in the form of an endless chain.

I claim as my invention—

1. In a grain-cutting machine, a grain-carrier, in combination with a knife having a reciprocating motion to and from the surface of the carrier, substantially as described.

2. In a grain-cutting machine, a grain-carrier formed with grooves, in which the kernels are conducted to the knife, in combination with a knife arranged crosswise of said grooves, and having a reciprocating motion in and out of them, substantially as described.

3. In a grain-cutting machine, a grain-carrier formed with grooves, in which the grain is carried to the cutters, in combination with a series of cutters, each of which has a reciprocating motion in and out of one of said grooves, substantially as described.

4. The rotary carrier b, formed with segmental rings e, driven into the periphery of the carrier, in combination with a knife consisting of the series of cutters c, having reciprocating motion to and from the carrier, substantially as described.

5. The rotary grooved carrier b, in combination with the strike o, formed of leather or its equivalent, and the series of reciprocating cutters c, substantially as described.

6. The reciprocating clamp a, formed with strip i, the series of cutters c, separating-strips s, follower c', and bolts v, in combination with the grooved rotary carrier b, substantially as described.

7. The lever h, in combination with knife-clamp a, and pin and spring h', substantially as described.

8. The knife-clamp a and crank-shaft a', in combination with pulleys 1 and 2, cone-pulleys 3 and 4, rod d', fork d², pulleys 5 and 6, pinions x x', wheels 7 and 8, and carrier b, substantially as described.

WILLIAM EBERHARD.

Witnesses:
GEO. W. SIEBER,
JOHN E. SIEBER.